US011917283B2

United States Patent
Abhishek et al.

(10) Patent No.: US 11,917,283 B2
(45) Date of Patent: Feb. 27, 2024

(54) SPLIT RENDERING FOR LIGHTFIELD/IMMERSIVE MEDIA USING EDGE-CLOUD ARCHITECTURE AND PEER-TO-PEER STREAMING

(71) Applicant: TENCENT AMERICA LLC, Palo Alto, CA (US)

(72) Inventors: Rohit Abhishek, San Jose, CA (US); Arianne Hinds, Palo Alto, CA (US); Paul Spencer Dawkins, Garland, TX (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/962,122

(22) Filed: Oct. 7, 2022

(65) Prior Publication Data

US 2023/0126243 A1     Apr. 27, 2023

Related U.S. Application Data (60) Provisional application No. 63/272,654, filed on Oct. 27, 2021.

(51) Int. Cl.
    *G09G 5/00*     (2006.01)
    *H04N 23/62*    (2023.01)
    *H04N 13/32*    (2018.01)

(52) U.S. Cl.
    CPC .............. *H04N 23/62* (2023.01); *H04N 13/32* (2018.05)

(58) Field of Classification Search
    CPC ...... H04N 23/62; H04N 13/32; H04N 21/632; H04N 21/234; H04N 21/266; H04N 21/8456; H04N 21/816; G06F 2209/5017; G06F 9/5072; H04L 67/10; H04L 67/1001; H04L 67/104
    USPC ................................ 345/156, 173, 183, 184
    See application file for complete search history.

(56) References Cited

U.S. PATENT DOCUMENTS

| | | | |
|---|---|---|---|
| 2018/0220164 A1* | 8/2018 | Helle | H04N 19/52 |
| 2019/0149864 A1 | 5/2019 | Britt et al. | |
| 2020/0244723 A1 | 7/2020 | Khalid | |
| 2020/0304776 A1* | 9/2020 | Ratcliff | H04N 13/366 |
| 2020/0366942 A1* | 11/2020 | Kirchhoffer | H04N 19/17 |
| 2021/0281638 A1 | 9/2021 | Vrcelj et al. | |
| 2022/0353732 A1* | 11/2022 | Filippou | H04W 28/0289 |
| 2023/0132420 A1* | 5/2023 | Abhishek | H04N 21/6332 725/14 |

(Continued)

OTHER PUBLICATIONS

International Search Report dated Feb. 9, 2023 issued by the International Searching Authority in Application No. PCT/US 22/46784.

(Continued)

*Primary Examiner* — Thuy N Pardo
(74) *Attorney, Agent, or Firm* — Sughrue Mion, PLLC (57) ABSTRACT

A system and method of split rendering for lightfield or immersive media by using an edge-cloud and peer-to-peer based architecture. The system and method include the use of a combination of cloud-based devices and edge-devices to provide distributed processing in connection with the streaming of media, and in particular lightfield or immersive media, to an end user device. The system and method further include the use of multiple cloud and edge devices to provide parallel streaming of a given media package to an end user device.

20 Claims, 4 Drawing Sheets

(56) References Cited

U.S. PATENT DOCUMENTS

| | | | | |
|---|---|---|---|---|
| 2023/0199241 A1* | 6/2023 | Asbun | .............. | H04N 21/44218 |
| | | | | 725/10 |
| 2023/0224533 A1* | 7/2023 | Abhishek | ......... | H04N 21/23412 |
| | | | | 725/118 |
| 2023/0293758 A1* | 9/2023 | Jin | .......................... | A61L 9/127 |
| | | | | 422/305 |
| 2023/0345012 A1* | 10/2023 | Winken | ................. | H04N 19/46 |

OTHER PUBLICATIONS

Written Opinion dated Feb. 9, 2023 issued by the International Searching Authority in Application No. PCT/US 22/46784.

* cited by examiner

SPLIT RENDERING FOR LIGHTFIELD/IMMERSIVE MEDIA USING EDGE-CLOUD ARCHITECTURE AND PEER-TO-PEER STREAMING

CROSS-REFERENCE TO RELATED APPLICATION

This application claims the priority benefit of U.S. Provisional Application No. 63/272,654 filed on Oct. 27, 2021, the disclosure of which is incorporated herein by reference.

BACKGROUND OF THE INVENTION

I. Field of the Invention

The disclosed subject matter relates to methods and systems for edge-cloud based architecture for split rendering for immersive media.

II. General Background

Immersive media is defined by immersive technologies that attempt to create, or imitate the physical world through digital simulation, thereby stimulating any or all human sensory systems so as to create the perception of the user being physically present inside the scene.

There are different types of immersive media technologies currently in play: Virtual Reality (VR), Augmented Reality (AR), Mixed Reality (MR), Light Field/Holographic, etc. VR refers to a digital environment replacing the user's physical environment by using a headset to place the user in a computer-generated world. AR on the other hand takes digital media and layers them on the real world around you by using either a clear vision glasses or smartphone. MR refers to blending of the real world with digital world thereby creating an environment in which technology and physical world can co-exist.

Light field/Holographic technologies consist of light rays in 3D space with rays coming from each point and direction. This technology is based on the concept that everything which is seen is illuminated by light coming from any source, travelling via space, and hitting the surface of the object where the light is partly absorbed and partly reflected to another surface before reaching our eyes. What exact light rays reaches our eyes depends on the user's precise position in the light field, and as the user moves around, the user perceives part of the light field and uses that perceived part to get an idea about the position of the object.

Light rays may be defined by 5 dimensional plenoptic operations where each ray may be defined by three coordinates in 3D space (3 dimensions) and two angles to specify the direction in 3D space.

A traditional camera is only able to capture a 2D representation of the light rays which reaches the camera lens at a given position. The image sensor records the sum of the brightness and color of all light rays reaching each pixel.

When it comes to capturing content for light field or holographic based displays, a light field camera is required which is capable of not only capturing brightness and color but also the direction of all light rays reaching the camera sensors. Using this information, a digital scene may be reconstructed with accurate representation of origin of each light ray making it possible to reconstruct the exact captured scene digitally in 3D.

Currently two major techniques are used to capture such volumetric scenes. The first technique is using an array of cameras or camera modules to capture different rays/views from each direction. The second technique consists of using a depth camera which can capture 3D information in a single exposure without needing structured illumination by measuring depth of multiple objects under controlled lighting conditions.

SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In accordance with an exemplary embodiment, a method of lightfield or immersive media streaming in a network comprising a cloud architecture, an edge architecture, and an end user device, the method performed by at least one processor. This method of lightfield or immersive media streaming comprises splitting a task associated with said lightfield or immersive media streaming into a plurality of computational tasks based on one or more delay factors, wherein a first set of the plurality of computational tasks are executed on said cloud architecture and a second set of the plurality of computational tasks are executed on said edge architecture, the second set of the plurality of computational tasks being different and non-overlapping from the first set of the plurality of computational tasks. This method further comprises streaming said lightfield or immersive media from said cloud architecture and said edge architecture to said end user device.

In accordance with an exemplary embodiment, A system for lightfield or immersive media streaming comprising a network, said network comprising a cloud architecture and an edge architecture, wherein said network is operable to stream lightfield or immersive media from said cloud architecture and said edge architecture to an end user device, at least one memory configured to store computer program code, and at least one processor configured to access said at least one memory and operate as instructed by said computer program code. In this system, the computer program code includes dividing code configured to cause the at least one processor to divide a plurality of computational tasks associated with said lightfield or immersive media streaming into a plurality of computational tasks based on one or more delay factors, wherein a first set of the plurality of computational tasks are executed on said cloud architecture and a second set of the plurality of computational tasks are executed on said edge architecture, the second set of the plurality of computational tasks being different and non-overlapping from the first set of the plurality of computational tasks.

In accordance with an exemplary embodiment, a non-transitory computer readable medium having instructions stored therein, which when executed by a processor cause the processor to execute a method of lightfield or immersive media streaming. This method of lightfield or immersive media streaming comprises splitting a task associated with said lightfield or immersive media streaming into a plurality of computational tasks based on one or more delay factors, wherein a first set of the plurality of computational tasks are executed on a cloud architecture and a second set of the plurality of computational tasks are executed on an edge architecture, the second set of the plurality of computational tasks being different and non-overlapping from the first set of the plurality of computational tasks. This method further comprises streaming said lightfield or immersive media from said cloud architecture and said edge architecture to said end user device.

Additional embodiments will be set forth in the description that follows and, in part, will be apparent from the description, and/or may be learned by practice of the presented embodiments of the disclosure.

BRIEF DESCRIPTION OF THE DRAWINGS

The foregoing and other objects, features, and advantages of the disclosure are apparent from the following detailed description taken in conjunction with the accompanying drawings in which like parts are given like reference numerals and, wherein.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Embodiments of the present disclosure are directed to a system and method of split rendering for lightfield or immersive media by using an edge-cloud and peer-to-peer based architecture. Currently all computing devices are dependent on the increase in computer power. Following Moore's law, the computing power continues to increase exponentially, as a result of adding more processing cores and bandwidth, besides increase in speed and reduction in chip size. However, with high performance apps, the requirement on the capacity and processing requirements are increasing. To bridge this gap an edge-cloud based rendering architecture is required.

Cloud-based computing offers the end-user with more ways of accessing the massive amount of computational capacity needed for modern computer graphics. With the current debate on how much processing one of ordinary skill in the art can fit in a smart-phone or in any AR/VR devices to render high quality video frames, the shift has moved to cloud-rendering since this elevates the game. Therefore, if sufficiently fast connections to significantly powerful online computing resources can be opened up, all small devices may be able to become a supercomputer, capable of streaming real-time videos and games.

Figure 1:
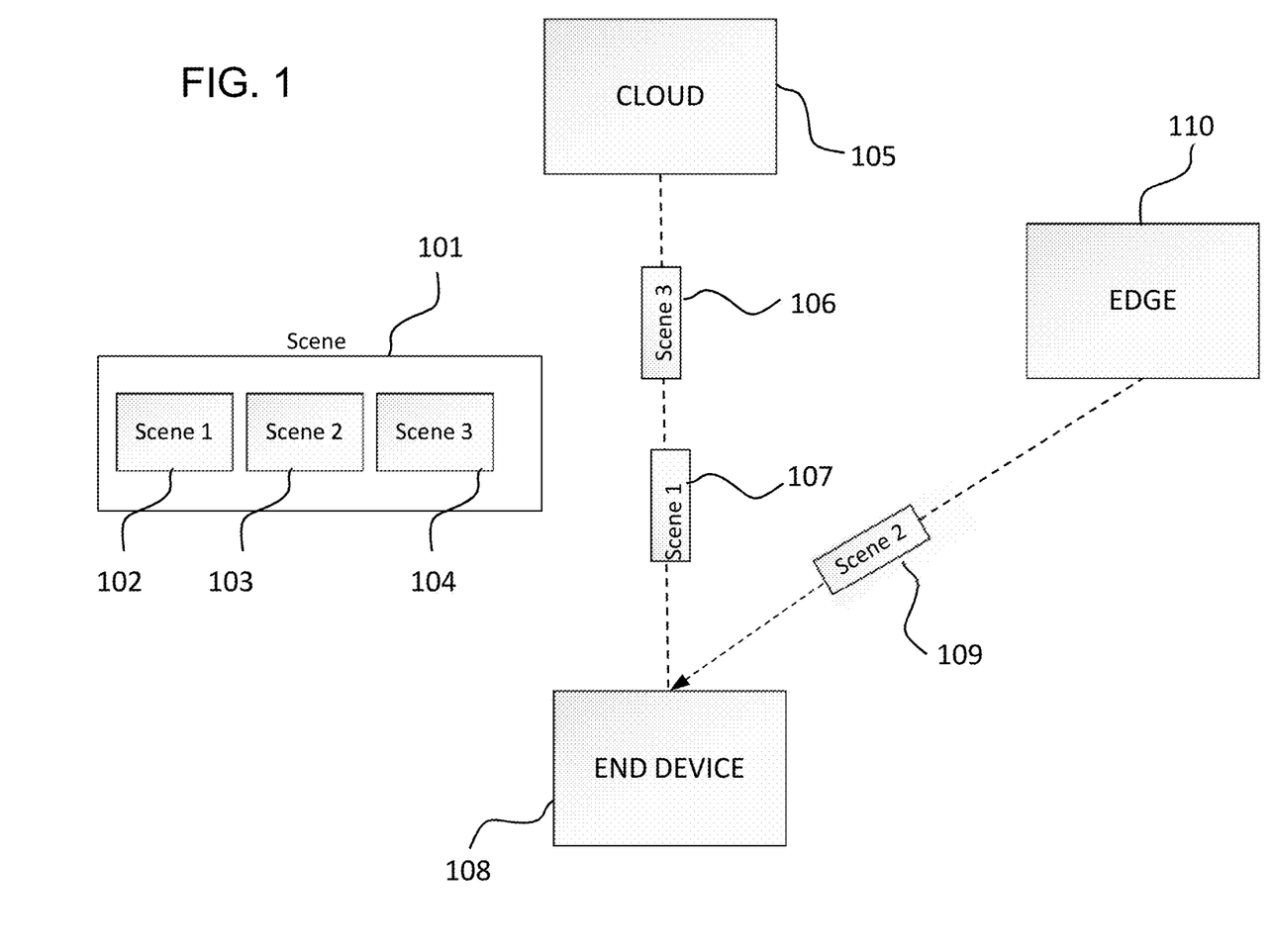
FIG. 1 depicts Edge-Cloud Architecture with scene assignment.

In an embodiment, a cloud-edge based split rendering architecture may be used for lightfield/immersive media streaming. This architecture reduces the requirement for processing on the end device itself. For instance, an end device might not require a GPU to provide acceptable user experience. The task split between the edge and the cloud may be dynamic, i.e., the task split between the edge and the cloud may be based on factors like sampling delay, computational delay inclusive of image processing and frame rendering delay, and networking delay comprising of queuing and transmission delay. Refer to FIG. 1, where a scene 101 is split into three components or scenes (102, 103, 104). The end device (108) based on the different deciding parameters streams scene 1 (107) and scene 3 (106) from the cloud (105) and scene 2 (109) from the edge (110). For the avoidance of doubt, references to a "scene" herein are by way of example only, and "scene" should be understood to include any media susceptible to streaming.

Figure 2:
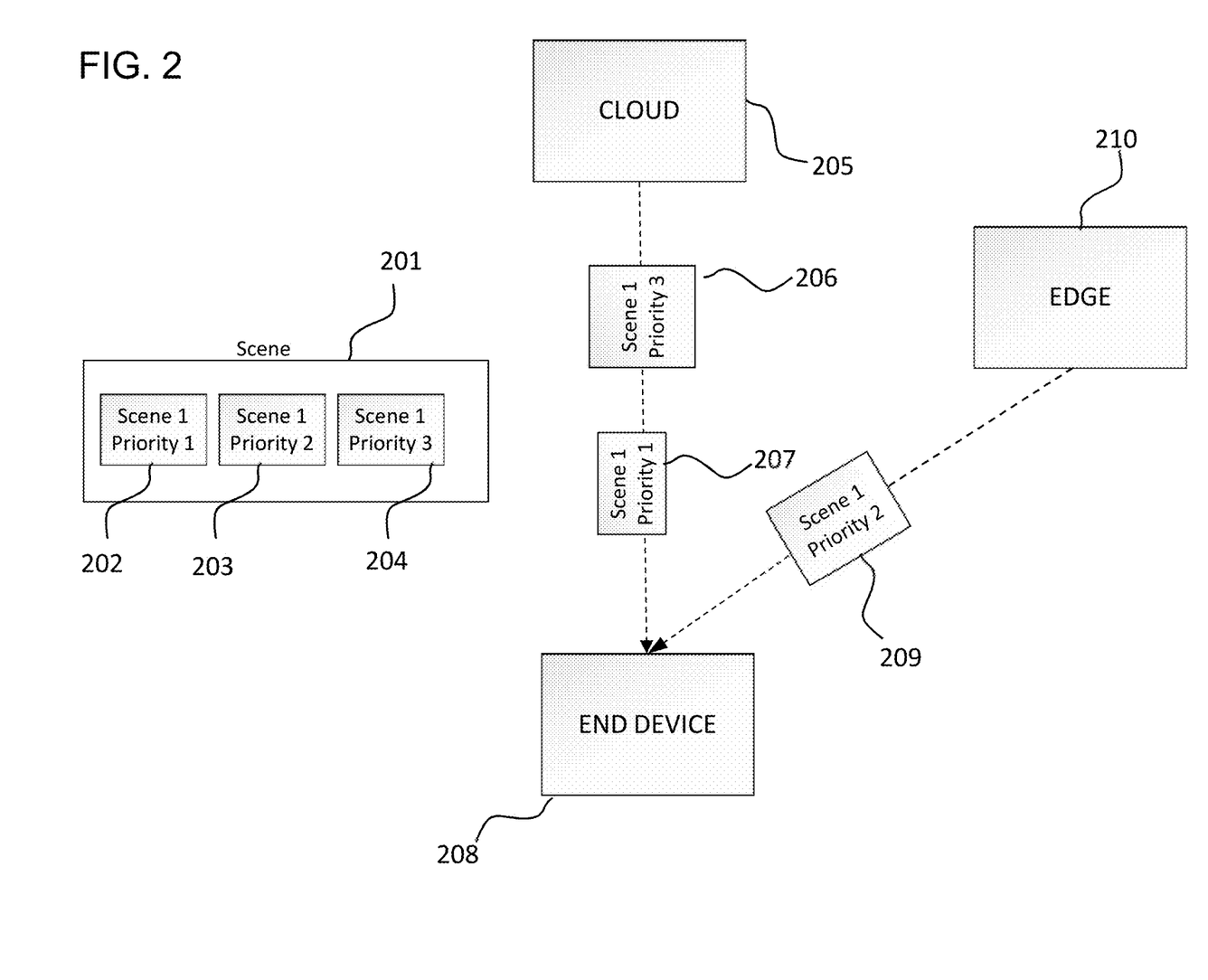
FIG. 2 shows Edge-Cloud Architecture with scene priority.

In the same embodiment, the task split between the edge and the cloud may also be based on adaptive streaming techniques. There may be two kinds of adaptive streaming methodologies which may be employed here: 1) adaptive streaming based on scene depth where instead of rendering the whole scene at once, the assets are rendered based on depth priority, and 2) adaptive streaming based asset priority where priority assets are rendered first. Therefore, instead of assigning the entire task at once, the task split is based on priority and the assignment is done sequentially. For example, refer to FIG. 2 where a scene 201 is split among three priorities (202, 203, 204). The end device (208) streams the portions of scene 201 with priority 1 (207) and priority 3 (206) from the cloud and streams the portion of scene 201 with priority 2 (209) from the edge. When a task is assigned, first the portion with higher priority is streamed either from the edge or the cloud depending on their available computational capability (sampling delay, computational delay inclusive of image processing and frame rendering delay, networking delay comprising of queuing and transmission delay).

Figure 3:
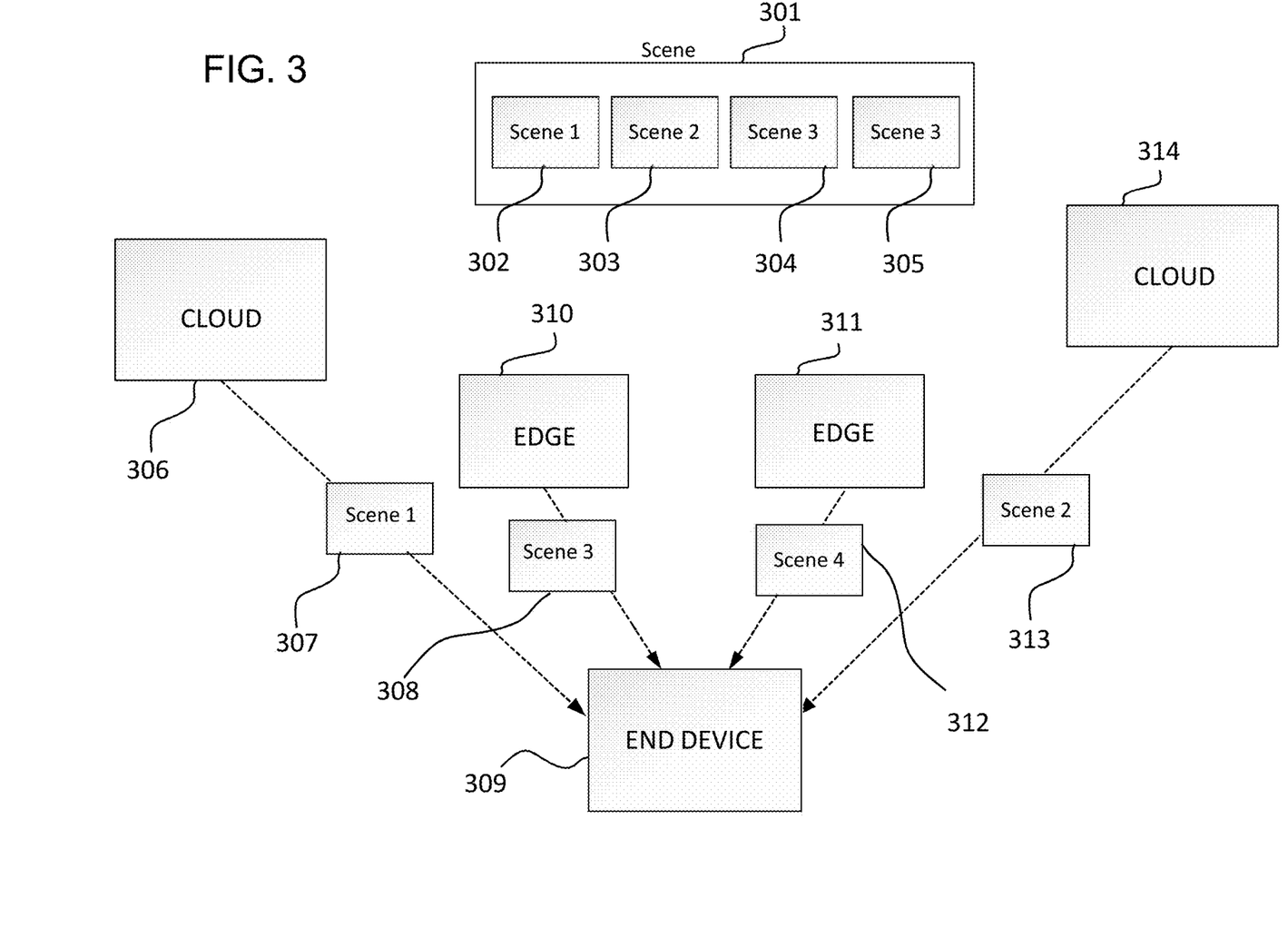
FIG. 3 illustrates multi-layered edge-cloud architecture.

In another embodiment, server/CDN may split a scene 301 into multiple scenes (302, 303, 304, 305) which may be stored in multiple edge-cloud systems (306, 310, 311, 314), thereby allowing an end user to process each scene in parallel (307, 308, 312, 313). This also means that instead of connecting to a single edge or cloud, the end user may be able to connect to multiple edges and clouds as demonstrated in FIG. 3. This would be based on the fact that processing the scenes in parallel would add no extra delay in processing compared to connecting to a single edge or cloud.

In another embodiment, a peer-to-peer streaming protocol may be applied for streaming for lightfield/immersive media. This avoids the need for each device to be connected to the cloud. Therefore, for each scene, the server will have the scene file as well as hash of the scene file. The hash of the scene file would indicate the source from which the scene file is downloaded. The end user would then be able to decide if the user wants to download the scene from the edge-cloud or do a peer-to-peer download, and to select an appropriate peer when multiple peers could provide the scene file.

The techniques for split rendering for lightfield or immersive media using edge-cloud architecture and peer-to-peer streaming may be implemented as computer software using computer-readable instructions and physically stored in one or more computer-readable media. For example, FIG. 4 shows a computer system 400 suitable for implementing certain embodiments of the disclosed subject matter.

The computer software may be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 4:
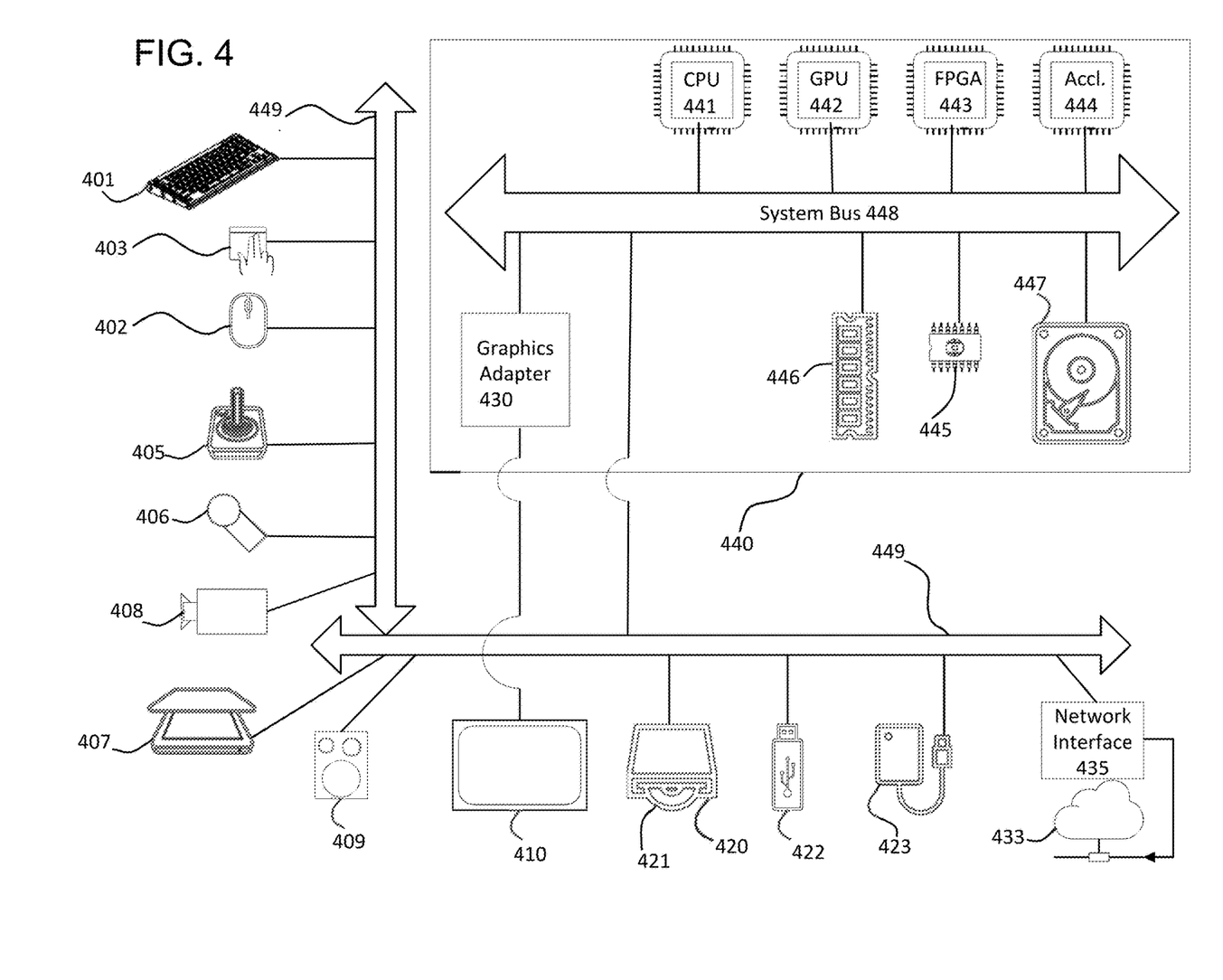
FIG. 4 is a schematic illustration of a computer system.

The components shown in FIG. 4 for computer system 400 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 400.

Computer system 400 may include certain human interface input devices. Such a human interface input device may be responsive to input by one or more human users through, for example, tactile input (such as keystrokes, swipes, data glove movements), audio input (such as voice, clapping), visual input (such as gestures), olfactory input (not depicted). The human interface devices can also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

Input human interface devices may include one or more of (only one of each depicted): keyboard 401, mouse 402, trackpad 403, touch screen 410, data-glove (not depicted), joystick 405, microphone 406, scanner 407, camera 408.

Computer system 400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 410, data-glove (not depicted), or joystick 405, but there can also be tactile feedback devices that do not serve as input devices), audio output devices (such as speakers 409, headphones (not depicted)), visual output devices (such as screens 410 to include CRT screens, LCD screens, plasma screens, OLED screens, each with or without touch-screen input capability, each with or without tactile feedback capability—some of which may be capable to output two-dimensional visual output or more than three-dimensional output through means such as stereographic output); virtual-reality glasses (not depicted), holographic displays and smoke tanks (not depicted)), and printers (not depicted).

Computer system 400 can also include human accessible storage devices and their associated media such as optical media including CD/DVD ROM/RW 420 with CD/DVD or the like media 421, thumb-drive 422, removable hard drive or solid-state drive 423, legacy magnetic media such as tape and floppy disc (not depicted), specialized ROM/ASIC/PLD based devices such as security dongles (not depicted), and the like.

Those skilled in the art should also understand that term "computer-readable media" as used in connection with the presently disclosed subject matter does not encompass transmission media, carrier waves, or other transitory signals.

Computer system 400 can also include an interface to one or more communication networks. Networks can, for example, be wireless, wireline, optical. Networks can further be local, wide-area, metropolitan, vehicular, and industrial, real-time, delay-tolerant, and so on. Examples of networks include local area networks such as Ethernet, wireless LANs, cellular networks to include GSM, 3G, 4G, 5G, LTE, and the like, TV wireline or wireless wide-area digital networks to include cable TV, satellite TV, and terrestrial broadcast TV, vehicular and industrial to include CANBus, and so forth. Certain networks commonly require external network interface adapters that attached to certain general-purpose data ports or peripheral buses (449) (such as, for example, USB ports of the computer system 400; others are commonly integrated into the core of the computer system 400 by attachment to a system bus as described below, for example Ethernet interface 435 into a PC computer system or cellular network 433 interface into a smartphone computer system). Using any of these networks, computer system 400 can communicate with other entities. Such communication can be uni-directional receive only (for example, broadcast TV), uni-directional send-only (for example, CANbus to certain CANbus devices), or bi-directional, for example to other computer systems using local or wide area digital networks. Certain protocols and protocol stacks can be used on each of those networks and network interfaces, as described above.

The aforementioned human interface devices, human-accessible storage devices, and network interfaces can be attached to a core 440 of the computer system 400.

The core 440 can include one or more Central Processing Units (CPU) 441, Graphics Processing Units (GPU) 442, specialized programmable processing units in the form of Field Programmable Gate Areas (FPGA) 443, hardware accelerators for certain tasks 444, and so forth. These devices, along with Read-only memory (ROM) 445, random-access memory 446, internal mass storage such as internal non-user accessible hard drives, SSDs, and the like 447, may be connected through a system bus 448. In some computer systems, the system bus 448 can be accessible in the form of one or more physical plugs to enable extensions by additional CPUs, GPU, and the like. The peripheral devices can be attached either directly to the core's system bus 448, or through a peripheral bus 449. Architectures for a peripheral bus include PCI, USB, and the like.

CPUs 441, GPUs 442, FPGAs 443, and accelerators 444 can execute certain instructions that, in combination, can make up the aforementioned computer code. That computer code can be stored in ROM 445 or RAM 446. Transitional data can be also be stored in RAM 446, whereas permanent data can be stored, for example, in the internal mass storage 447. Fast storage and retrieval to any of the memory devices can be enabled through the use of cache memory, which can be closely associated with one or more CPU 441, GPU 442, mass storage 447, ROM 445, RAM 446, and the like.

The computer-readable media can have computer code thereon for performing various computer-implemented operations. The media and computer code can be specially designed and constructed for the purposes of the present disclosure, or they can be of the kind well known and available to those having skill in the computer software arts.

As an example, and not by way of limitation, the computer system having architecture 400, and specifically the core 440 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 440 that are of non-transitory nature, such as core-internal mass storage 447 or ROM 445. The software implementing various embodiments of the present disclosure can be stored in such devices and executed by core 440. A computer-readable medium can include one or more memory devices or chips, according to particular needs. The software can cause the core 440 and specifically the processors therein (including CPU, GPU, FPGA, and the like) to execute particular processes or particular parts of particular processes described herein, including defining data structures stored in RAM 446 and modifying such data structures according to the processes defined by the software. In addition, or as an alternative, the computer system can provide functionality as a result of logic hardwired or otherwise embodied in a circuit (for example, accelerator 444), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of lightfield or immersive media streaming in a network comprising a cloud architecture, an edge architecture, and an end user device, the method performed by at least one processor and comprising:
   splitting a task associated with said lightfield or immersive media streaming into a plurality of computational tasks based on one or more delay factors, wherein a first set of the plurality of computational tasks are executed on said cloud architecture and a second set of the plurality of computational tasks are executed on said edge architecture, the second set of the plurality of computational tasks being different and non-overlapping from the first set of the plurality of computational tasks; and
   streaming said lightfield or immersive media from said cloud architecture and said edge architecture to said end user device.

2. The method of claim 1, wherein splitting the task further comprises:
   analyzing one or more predetermined metrics comprising said delay factors associated with said network; and
   assigning a given computational task of said plurality of computational tasks associated with said lightfield or immersive media streaming to either said cloud architecture or said edge architecture based on said analyzing of said one or more predetermined metrics associated with said network.

3. The method of claim 2, wherein said one or more predetermined metrics include one or more of a sampling delay, a computational delay, an image processing load, a frame rendering delay, and a networking delay, wherein the networking delay further comprises a queuing and a transmission delay.

4. The method of claim 2, wherein said network is operable to implement a peer-to-peer streaming protocol.

5. The method of claim 1, wherein said cloud architecture comprises a plurality of cloud devices and said edge architecture comprises a plurality of edge devices, said method further comprising:
   dividing said lightfield or immersive media into a plurality of components;
   storing each component of said plurality of components on said plurality of cloud devices and said plurality of edge devices; and
   delivering said plurality of components to said end user device in parallel.

6. The method of claim 5, wherein splitting the task further comprises:
   analyzing one or more predetermined metrics comprising said delay factors associated with said network; and
   assigning a given computational task of said plurality of computational tasks associated with said lightfield or immersive media streaming to a given cloud device of said plurality of cloud devices or a given edge device of said plurality of edge devices based on said analyzing of said one or more predetermined network metrics;
   wherein said one or more predetermined metrics include a sampling delay, a computational delay, an image processing load, a frame rendering delay, and a networking delay, and wherein the networking delay further comprises a queuing and a transmission delay.

7. The method of claim 1, wherein said splitting the task comprises an adaptive streaming technique, said adaptive streaming technique comprising adaptive streaming based on a depth priority or adaptive streaming based on an asset priority.

8. A system for lightfield or immersive media streaming comprising:
   a network, said network comprising a cloud architecture and an edge architecture, wherein said network is operable to stream lightfield or immersive media from said cloud architecture and said edge architecture to an end user device;
   at least one memory configured to store computer program code; and
   at least one processor configured to access said at least one memory and operate as instructed by said computer program code, said computer program code including dividing code configured to cause the at least one processor to divide a plurality of computational tasks associated with said lightfield or immersive media streaming into a plurality of computational tasks based on one or more delay factors, wherein a first set of the plurality of computational tasks are executed on said cloud architecture and a second set of the plurality of computational tasks are executed on said edge architecture, the second set of the plurality of computational tasks being different and non-overlapping from the first set of the plurality of computational tasks.

9. The system of claim 8, wherein said computer program code further includes assigning code configured to cause the at least one processor to assign a given computational task of said plurality of computational tasks to either said cloud architecture or said edge architecture based on an analysis of one or more predetermined metrics comprising said delay factors associated with said network.

10. The system of claim 9, wherein said one or more predetermined metrics include one or more of a sampling delay, a computational delay, an image processing load, a frame rendering delay, and a networking delay, wherein the networking delay further comprises a queuing and a transmission delay.

11. The system of claim 9, wherein said network is operable to implement a peer-to-peer streaming protocol.

12. The system of claim 8, wherein said cloud architecture comprises a plurality of cloud devices and said edge architecture comprises a plurality of edge devices, wherein said lightfield or immersive media is divided into a plurality of components, and wherein said system is operable to store each component of said plurality of components on said plurality of cloud devices and said plurality of edge devices and to deliver said plurality of components to said end user device in parallel.

13. The system of claim 12, wherein said computer program code further includes assigning code configured to cause the at least one processor to assign a given computational task of said plurality of computational tasks associated with said lightfield or immersive media streaming to a given cloud device of said plurality of cloud devices or a given edge device of said plurality of edge devices based on an analysis of one or more predetermined metrics; wherein said one or more predetermined metrics associated with said network comprise a sampling delay, a computational delay, an image processing load, a frame rendering delay, and a networking delay; and wherein the networking delay further comprises a queuing and a transmission delay.

14. The system of claim 8, wherein dividing code implements an adaptive streaming technique, wherein said adaptive streaming technique comprises adaptive streaming based on a depth priority or adaptive streaming based on an asset priority.

15. A non-transitory computer readable medium having instructions stored therein, which when executed by a processor cause the processor to execute a method of lightfield or immersive media streaming, the method comprising:
   splitting a task associated with said lightfield or immersive media streaming into a plurality of computational tasks based on one or more delay factors, wherein a first set of the plurality of computational tasks are executed on a cloud architecture and a second set of the plurality of computational tasks are executed on an edge architecture, the second set of the plurality of computational tasks being different and non-overlapping from the first set of the plurality of computational tasks; and
   streaming said lightfield or immersive media from said cloud architecture and said edge architecture to said end user device.

16. The non-transitory computer readable medium of claim 15, wherein splitting the task further comprises:
   analyzing one or more predetermined metrics comprising said delay factors associated with said network; and
   assigning a given computational task of said plurality of computational tasks associated with said lightfield or immersive media streaming to either said cloud architecture or said edge architecture based on said analyzing of said one or more predetermined metrics.

17. The non-transitory computer readable medium of claim 16, wherein said one or more predetermined metrics include one or more of a sampling delay, a computational delay, an image processing load, a frame rendering delay, and a networking delay, wherein said networking delay further comprises a queuing delay and a transmission delay.

18. The non-transitory computer readable medium of claim 15, wherein said cloud architecture comprises a plurality of cloud devices and said edge architecture comprises a plurality of edge devices, said method further comprising:
   dividing said lightfield or immersive media into a plurality of components;

storing each component of said plurality of components on said plurality of cloud devices and said plurality of edge devices; and delivering said plurality of components to said end user device in parallel.

19. The non-transitory computer readable medium of claim 18, wherein splitting the task further comprises:

analyzing one or more predetermined metrics comprising said delay factors associated with said network; and assigning a given computational task of said plurality of computational tasks associated with said lightfield or immersive media streaming to a given cloud device of said plurality of cloud devices or a given edge device of said plurality of edge devices based on said analyzing of said one or more predetermined metrics.

20. The non-transitory computer readable medium of claim 19, wherein said one or more predetermined metrics include one or more of a sampling delay, a computational delay, an image processing load, a frame rendering delay, and a networking delay, wherein said networking delay comprises a queuing delay and a transmission delay.

* * * * *